United States Patent
Lipnevicius

(10) Patent No.: US 8,651,357 B2
(45) Date of Patent: Feb. 18, 2014

(54) ROBOT POSITIONER

(75) Inventor: Geoff Lipnevicius, Sagamore Hills, OH (US)

(73) Assignee: Lincoln Global, Inc., City of Industry, CA (US)

( * ) Notice: Subject to any disclaimer, the term of this patent is extended or adjusted under 35 U.S.C. 154(b) by 223 days.

(21) Appl. No.: 12/614,521

(22) Filed: Nov. 9, 2009

(65) Prior Publication Data

US 2011/0108607 A1    May 12, 2011

(51) Int. Cl.
  *B23K 37/04* (2006.01)
  *B23K 37/02* (2006.01)

(52) U.S. Cl.
  USPC ............ 228/45; 228/49.1; 219/79; 219/124.1

(58) Field of Classification Search
  USPC ......................... 228/45, 49.1; 219/79, 124.1
  See application file for complete search history.

(56) References Cited

U.S. PATENT DOCUMENTS

| | | | |
|---|---|---|---|
| 4,546,233 A | 10/1985 | Yasuoka | |
| 5,083,070 A | 1/1992 | Poupard et al. | |
| 5,337,938 A | 8/1994 | Gilbert | |
| 5,921,459 A | 7/1999 | Heraly et al. | |
| 6,622,906 B1 | 9/2003 | Kushibe | |
| 2001/0035449 A1 | 11/2001 | Angel | |
| 2002/0134815 A1 | 9/2002 | Angel | |
| 2004/0138782 A1* | 7/2004 | Passmore et al. ............. | 700/248 |
| 2007/0235433 A1 | 10/2007 | Osicki | |

FOREIGN PATENT DOCUMENTS

DE            19904422           3/2000

OTHER PUBLICATIONS

Machine Translation of DE 19904422 A1, originally published Mar. 16, 2000.*
International Preliminary Report on Patentability; Corresponding PCT Application No. PCT/IB2010/002849; Authorized Officer Caubet, J.; Mar. 5, 2012 (8 pages).
Written Opinion issued in PCT/US2010/045825, Mar. 28, 2011.
International Search Report issued in PCT/US2010/045825, Mar. 28, 2011.

* cited by examiner

*Primary Examiner* — Nicholas P D'Aniello
(74) *Attorney, Agent, or Firm* — Pearne & Gordon LLP

(57) ABSTRACT

An embodiment of a robotic welding apparatus comprises a robot having a welding torch and a base, where the base rotates about an axis of rotation. The embodiment further comprises an indexing table including a plurality of workpiece holding positions, where the indexing table is fixedly connected to the base substantially at a center position of the indexing table, and where the indexing table rotates about the axis of rotation.

15 Claims, 2 Drawing Sheets

ROBOT POSITIONER

FIELD OF INVENTION

The present application relates to a positioner for a welding system. More particularly, the present application relates to a workpiece positioner with multiple workpiece holding positions.

BACKGROUND

A workpiece positioner accepts a workpiece that is mounted to the positioner or mounted to a fixture attached to the positioner. The positioner rotates to index the workpiece to be welded from an operator's station to a welding station. Welding is halted while the positioner rotates to index a workpiece to be unloaded from the welding station to the operator's station.

SUMMARY

An embodiment of a robotic welding apparatus comprises a robot having a welding torch and a base, where the base rotates about an axis of rotation. The embodiment further comprises an indexing table including a plurality of workpiece holding positions, where the indexing table is fixedly connected to the base substantially at a center position of the indexing table, and where the indexing table rotates about the axis of rotation.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. The drawings are not to scale and the proportion of certain elements may be exaggerated for the purpose of illustration.

DETAILED DESCRIPTION

Figure 1:
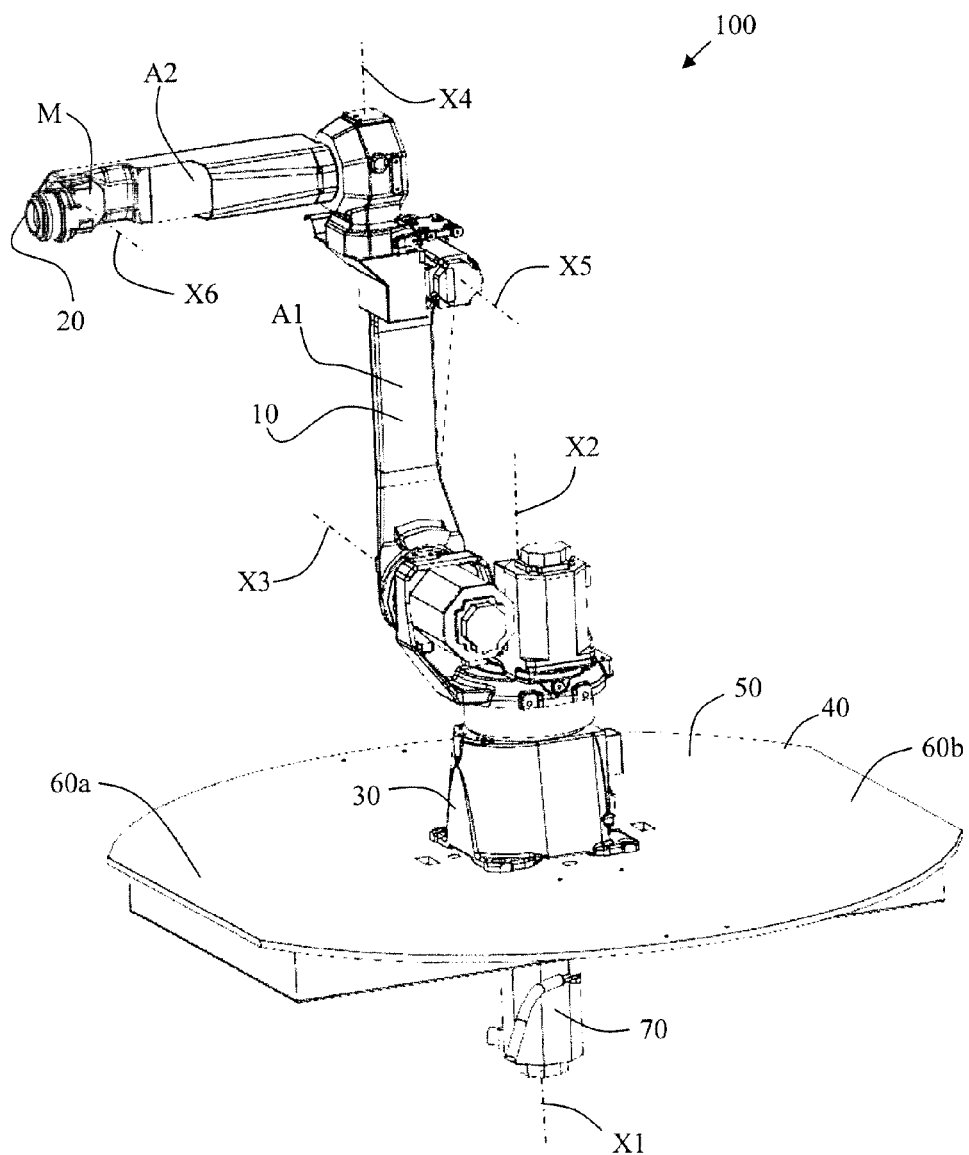
FIG. 1 illustrates a perspective view of an embodiment of a robot positioner.
Figure 2:
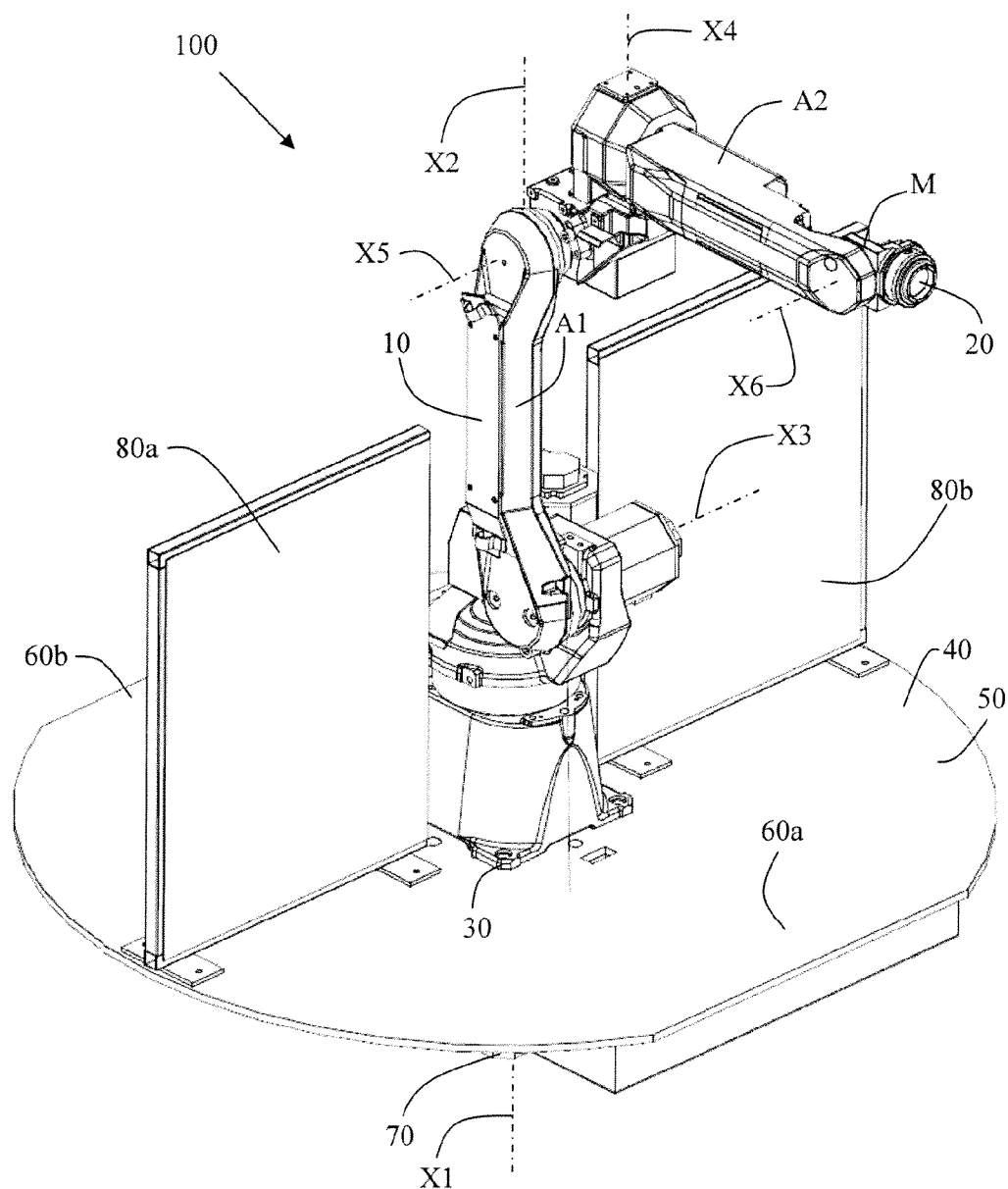
FIG. 2 illustrates a perspective view of an embodiment of a robot positioner with protective shields.

FIGS. 1 and 2 illustrate perspective views of an embodiment of a robot positioner 100. The positioner 100 is an apparatus that may be used in welding. An operator may load to the positioner 100 individual components of a workpiece to be welded and hold the individual components in place with holding devices (not shown).

In the illustrated embodiment, the positioner 100 includes a robot or robot arm 10. The robot arm 10 has a welding torch 20 and a base 30, a proximal portion A1, and a distal portion A2. The base 30 is configured to rotate about a first axis X1. The proximal portion A1 is rotably connected to the base 30 and is configured to rotate about a second axis X2 and a third axis X3. The distal portion A2 is rotably connected to the proximal portion A1 and is configured to rotate about a fourth axis X4 and a fifth axis X5. In the illustrated embodiment, the robot arm 10 further includes a torch mounting bracket M to which the welding torch 20 is mounted. Torch mounting bracket M is connected to the distal portion A2 and rotates about a sixth axis X6. It should be understood, however, that the illustrated robot arm 10 is merely exemplary, and that other embodiments of the positioner 100 may employ other robots or robot arms.

The positioner 100 may also include a rotary or indexing table 40. The base 30 and the indexing table 40 are fixedly connected at the center of the indexing table 40. The base 30 and the indexing table 40 may be fixedly connected by methods known in the art (e.g. screws, nuts and bolts, rivets, welds and so on). Thus, fixedly connected includes connection that are permanent (e.g. rivets) and connections that are not permanent (e.g screws). However, the base 30 and the indexing table 40 being fixedly connected excludes connections where the base 30 and the indexing table 40 would rotate independent of each other. In one embodiment, the base 30 and the indexing table 40 are fixedly connected in that they are constructed as one piece and are therefore one single part instead of two. In the illustrated embodiment, the base 30 is mounted to the top surface 50 of the indexing table 40 and substantially at the center of the indexing table 40. Since the base 30 and the indexing table 40 are fixedly connected, they rotate together about the first axis X1.

Indexing table 40 may include a plurality of workpiece holding portions or positions 60a-b on the top surface 50. Each of the workpiece holding positions 60a-b is configured to accept or hold workpieces to be welded (not shown) or fixtures that, in turn, accept or hold the workpieces to be welded. In the illustrated embodiment, the indexing table 40 includes two workpiece holding positions 60a-b. In this embodiment, the first workpiece holding position 60a is located opposite the second workpiece holding position 60b on the indexing table 40. In other embodiments, the indexing table 40 may include three or more workpiece holding positions.

A workpiece holding position may be customizable to accept various different fixtures, holders, etc. depending on the welding application. Thus, together the holding positions include the entire working area of the indexing table. In the illustrated example, which shows two workpiece holding positions 60a-b, the workpiece holding positions 60a-b each includes half of the total working area of the indexing table 40.

In one embodiment, the robot arm 10 has a range or span such that the welding torch 20 reaches all workpieces on the indexing table 40. In such an embodiment, the robot arm 10 can weld workpieces held at all of the workpiece holding positions.

The positioner 100 may also include a motor 70. In the illustrated embodiment, the motor 70 is operatively connected to the indexing table 40. In alternative embodiments, the motor 70 may be operatively connected to the robot arm 10 or to both the robot arm 10 and the indexing table 40. The motor 70 is configured to cause the robot arm 10 and the indexing table 40 to rotate together about the first axis X1 to index the workpiece holding positions 60a-b.

The positioner 100 may index the first workpiece holding position 60a to a loading/unloading zone (not shown) so that the operator may load a first workpiece to the first workpiece holding position 60a or to a fixture or holder at the first workpiece holding position 60a. While the operator loads the first workpiece to the first workpiece holding position 60a, the robot arm 10 may weld a second workpiece previously loaded to the second workpiece holding position 60b.

The positioner 100 may also be configured such that the robot arm 10 welds while the robot arm 10 and the indexing table 40 rotate.

In one embodiment, the positioner 100 indexes the first workpiece holding position 60a to the loading/unloading zone so that the operator may load the first workpiece to the first workpiece holding position 60a. Promptly after the operator has loaded the first workpiece to the first workpiece holding position 60a, the robot arm 10 begins welding the first workpiece as the indexing table 40 rotates to index the second workpiece holding position 60b to the loading/unloading zone.

In another embodiment, the positioner 100 indexes the first workpiece holding position 60a to the loading/unloading zone so that the operator may load the first workpiece to the first workpiece holding position 60a. Promptly after the operator has loaded the first workpiece to the first workpiece holding position 60a, the indexing table 40 rotates to index the second workpiece holding position 60b to the loading/unloading zone while the robot arm 10 welds or continues to weld a second workpiece held in the second workpiece holding position 60b.

In one embodiment illustrated in FIG. 2, the positioner 100 includes a plurality of shields 80a-b operatively connected to the indexing table 40. Each shield is located between two workpiece holding positions. In the illustrated example, shields 80a-b are each located between the workpiece holding positions 60a-b. The shields 80a-b provide shielding and protection to areas outside the workpiece holding positions 60a-b during performance of operations such as welding, hard facing, and so on. In an alternative embodiment (not shown), the positioner may include three or more shields. The number of shields may correspond to the number of workpiece holding positions, with each shield being located between two workpiece holding positions.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components. An "operable connection," or a connection by which entities are "operably connected," is one by which the operably connected entities or the operable connection perform its intended purpose. For example, two entities may be operably connected to each other directly or through one or more intermediate entities.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A robotic welding apparatus comprising:
    a robot having a welding torch and a base, where the robot rotates about a first axis of rotation and a second axis of rotation, and where the base rotates about the first axis of rotation, wherein the first axis and the second axis pass centrally through the base;
    an indexing table including a plurality of workpiece holding positions located on a top surface of the indexing table, the plurality of workpiece holding positions including at least a first workpiece holding position and a second workpiece holding position, where the indexing table rotates about the first axis of rotation, and where the base is fixedly connected to the top surface substantially at a center position of the indexing table so as to exclude independent rotation between the base and the indexing table;
    a motor operatively connected to at least one of the robot and the indexing table such that the base of the robot and the indexing table rotate together about the first axis of rotation to index the plurality of workpiece holding positions; and
    a plurality of shields operatively connected to the indexing table,
    wherein the robot is configured to weld a first workpiece held in the first workpiece holding position while the indexing table indexes one of the plurality of workpiece holding positions to a loading/unloading zone, where the second workpiece holding position is located opposite the first workpiece holding position, and the base of the robot is fixedly mounted to the top surface of the indexing table at a location between the first workpiece holding position and the second workpiece holding position and the plurality of shields, so as to rotate with the first workpiece holding position and the second workpiece holding position and the plurality of shields as the indexing table indexes said one of the plurality of workpiece holding positions to the loading/unloading zone.

2. The robotic welding apparatus of claim 1, where the robot is configured to weld a second workpiece previously loaded to the second workpiece holding position while the first workpiece is being loaded to the first workpiece holding position.

3. The robotic welding apparatus of claim 1, where the robot is configured to weld the first workpiece held in the first workpiece holding position while the indexing table indexes the first workpiece holding position to the loading/unloading zone.

4. The robotic welding apparatus of claim 1, where the robot is configured to weld the first workpiece held in the first workpiece holding position while the indexing table indexes the second workpiece holding position to the loading/unloading zone.

5. The robotic welding apparatus of claim 1, where the robot is configured to have a range such that the welding torch may reach all workpiece holding positions on the indexing table.

6. A workpiece positioner comprising:
    a robot arm including a welding torch operatively connected to the robot arm, wherein the robot arm rotates about a first axis and a second axis;
    a base, wherein the robot arm is rotatable connected to the base;

a rotary indexing table including a top surface having a plurality of workpiece holding portions and a center portion, the plurality of workpiece holding portions including at least a first workpiece holding portion and a second workpiece holding portion, where the base is fixedly connected to the top surface of the rotary indexing table, substantially at the center portion, so as to exclude independent rotation between the base and the rotary indexing table;

a motor operatively connected to one or more of the robot arm and the rotary indexing table, where the motor is configured to cause the robot arm, the base, and the rotary indexing table to rotate as one about the first axis while indexing the plurality of workpiece holding portions, and the robot arm is separately rotatable about a second axis passing centrally through the base; and a plurality of shields operatively connected to the rotary table, each shield located between two workpiece holding portions from the plurality of workpiece holding portions;

wherein the welding torch is configured to weld a first workpiece held by the first workpiece holding portion while the rotary indexing table indexes one of the plurality of workpiece holding portions to a loading/unloading zone, where the first workpiece holding portion is located opposite the second workpiece holding portion, and the base is fixedly mounted to the top surface of the indexing table at a location between the first workpiece holding portion and the second workpiece holding portion and the plurality of shields, so as to rotate with the first workpiece holding portion and the second workpiece holding portion and the plurality of shields as the rotary indexing table indexes said one of the plurality of workpiece holding portions to the loading/unloading zone.

7. The workpiece positioner of claim 6, where the second workpiece holding portion from the plurality of workpiece holding portions is configured to hold a second workpiece.

8. The workpiece positioner of claim 7, where the first workpiece holding portion is configured to receive the first workpiece while the welding torch welds the second workpiece held by the second workpiece holding portion.

9. The workpiece positioner of claim 7, where the rotary indexing table is configured to rotate to index the first workpiece holding portion in the loading/unloading zone while the welding torch welds the second workpiece held in the second workpiece holding portion.

10. The workpiece positioner of claim 7, where the rotary indexing table is configured to rotate to index the first workpiece holding portion in the loading/unloading zone while the welding torch welds the first workpiece held in the first workpiece holding portion.

11. The workpiece positioner of claim 6, where the second workpiece holding portion is configured to hold a second workpiece, where the welding torch is configured to weld at least one of the first workpiece and the second workpiece while the robot arm and the rotary indexing table rotate.

12. The workpiece positioner of claim 6, where the robot arm has a span such that the welding torch reaches workpieces held at all workpiece holding portions.

13. A robotic welding apparatus configured to hold multiple workpieces, the apparatus comprising:

an indexing table having a top surface including a center portion and portions configurable to hold a plurality of workpieces, said portions including at least a first workpiece holding portion and a second workpiece holding portion;

a robot arm having a base directly and fixedly connected to the top surface of the indexing table substantially at the center portion and where the robot arm is configured to rotate about a first axis in unison with the indexing table and about a second axis passing centrally through the base, where the base is disposed at a fixed position relative to the indexing table, such that independent rotation between the base and the indexing table is excluded;

a motor configured to rotate the robot arm, the base, and the indexing table simultaneously as one about the first axis while indexing the second workpiece holding portion to a loading/unloading zone while the robot arm welds a first workpiece held at the first workpiece holding portion; and a plurality of shields operatively connected to the indexing table, wherein the base is fixedly connected to the top surface of the indexing table at a location between the first workpiece holding portion, the second workpiece holding portion and the plurality of shields.

14. The robotic welding apparatus of claim 13, where the robot arm is configured to weld the first workpiece while the motor rotates the indexing table to index a second workpiece held on the indexing table to the loading/unloading zone.

15. The robotic welding apparatus of claim 13, where the robot arm is configured to weld the first workpiece while the motor rotates the indexing table to index the first workpiece held on the indexing table the loading/unloading zone.

* * * * *